United States Patent [19]

Ahner

[11] 4,069,752

[45] Jan. 24, 1978

[54] HAND PRESS

[76] Inventor: Reinhard Ahner, 25, Wolfganggasse, A-1120 Vienna, Austria

[21] Appl. No.: 688,725

[22] Filed: May 21, 1976

[51] Int. Cl.² .............................................. B30B 9/02
[52] U.S. Cl. .................................... 100/112; 100/125; 100/234
[58] Field of Search ............... 100/125, 234, 243, 112; 7/99, 101, 105

[56] References Cited

U.S. PATENT DOCUMENTS 2,776,616  1/1957  Sarossy ........................... 100/125 X

FOREIGN PATENT DOCUMENTS 1,111,677  3/1956  France .................................. 100/234

Primary Examiner—Billy J. Wilhite
Attorney, Agent, or Firm—Imirie, Smiley & Guay

[57] ABSTRACT

A hand press for a vegetable, herb, spice or fruit, such as garlic, comprises two double-armed levers having arms of unequal length. The shorter arms constitute a pressing member and a sieve member. The longer arms constitute handles. A pinned plate is provided, which is set with pins, which protrude from the plate and are arranged in the same pattern as the holes in the sieve member. The pins are adapted to enter the holes of the sieve member when the pressing operation has been terminated and the pressing member has been removed from the sieve member.

4 Claims, 4 Drawing Figures

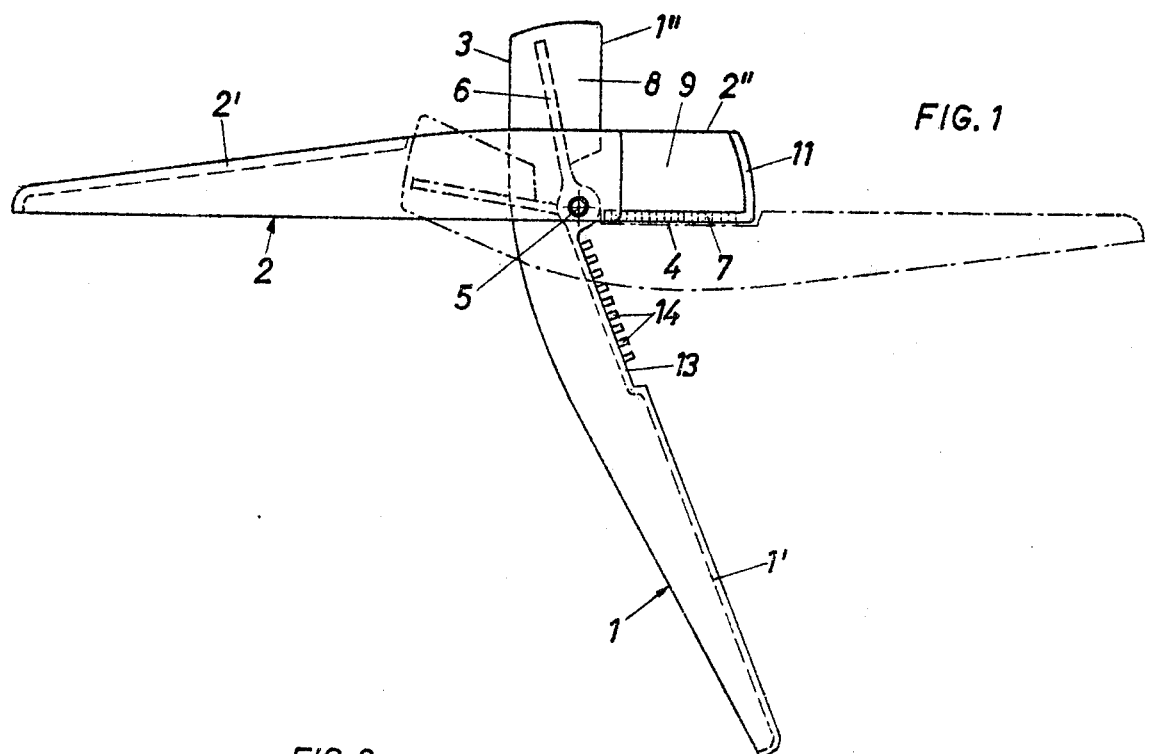
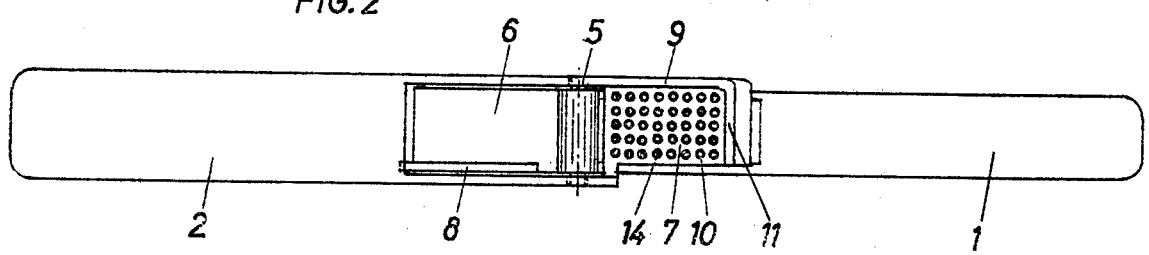
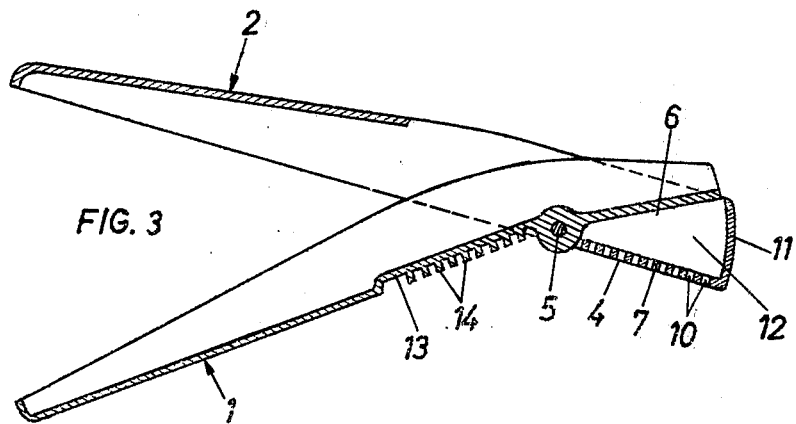

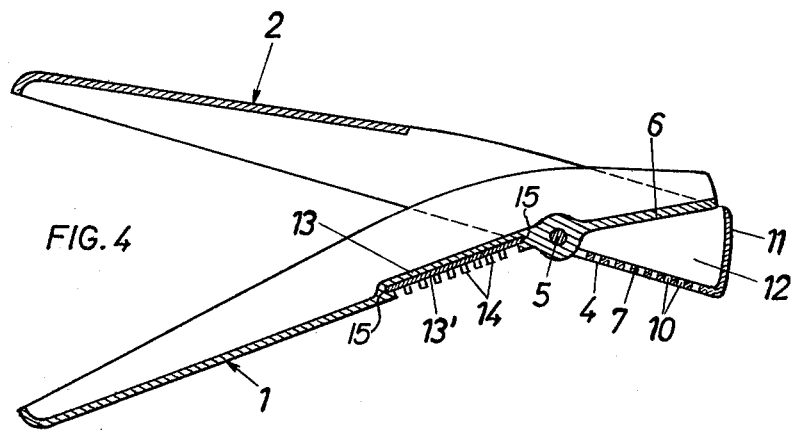

HAND PRESS

BACKGROUND OF THE INVENTION

Presses of this kind are mainly intended for table use, particularly when it is desired to spice food with freshly squeezed garlic juice. The previously known plierlike implements comprising a sieve member and a pressing member have the disadvantage that the holes of the sieve are soon clogged by garlic fibers, which can be removed only with difficulty. It has already been proposed that that member which is provided with the sieve openings tapers in thickness at its free end in the longitudinal direction of the levers. Whereas the cleaning is facilitated by this feature, the same has been successful only in part because a narrow brush is required to enter the container, which is closed on both longitudinal sides, and to clean the holes. In many cases the holes cannot be sufficiently cleaned even with brushes so that the housewife can remove residues from the holes only in that a pointed element is pushed through each hole. Otherwise spiced residue could adversely affect the taste of the juice.

It is known from French Patent Specification No. 1,111,677 to provide the pressing member on that surface which faces the sieve holes with pins, which are arranged in the same pattern as the sieve holes and which at the end of the pressing operation enter the sieve holes so that the same are cleaned after each pressing operation. This advantage is accompanied by the disadvantage that not only the juice but also fibers of fruit which is pressed are forced through the sieve holes and enter the food.

It has also been proposed to provide hand presses of this kind with a removable sieve plate. Whereas such sieve plate can be cleaned more easily than a sieve bottom which is a fixed part of the implement, the housewife must still push through each hole for a thorough cleaning of the sieve plate.

It is an object of the invention to provide measures which ensure that the above-mentioned disadvantages are avoided and that the sieve member can easily and thoroughly be cleaned remote from the food when the pressing operation has been performed.

Another object of the invention is to provide means which enable also the use of any desired brushes, cloths or the like for a removal of residual fruit material which has been forced back onto the inside surface of the sieve member.

It is a further object of the invention to provide means which during the squeezing of juice from fruit prevent a lateral escape of unsieved juice and which when the implement is open permit of a removal of residual matter past the broad end with a cloth or with a cleaning brush of any desired width or the like.

SUMMARY OF THE INVENTION

The hand press consists of two double-armed levers, which are pivotally connected. One arm of one lever constitutes a sieve member and cooperates with a pressing member constituted by one arm of the other lever. A pinned plate is provided, which has pins which are arranged in the same pattern as the holes in the sieve and are adapted to be inserted into the holes of the sieve bottom after the pressing operation.

Further details of the invention will be explained more fully with reference to the drawing, which shows by way example an embodiment of the hand press according to the invention.

FIG. 1 is a side view showing the hand press in a partly open position,

FIG. 2 a top plan view showing the hand press in an open position,

FIG. 3 is a longitudinal sectional view showing the hand press at the beginning of the pressing operation, and FIG. 4 is a longitudinal sectional view similar to FIG. 3 of a modified hand press according to the present invention.

DETAILED DESCRIPTION OF THE INVENTION

The hand press embodying the invention comprises two double-armed levers 1, 2, which are pivotally connected at 5 and have arms 1', 1" and 2', 2" of unequal length. The longer arms 1', 2' constitute handles. The shorter arms 1" and 2" constitute a pressing member 3 and a sieve member 4, respectively. The pivotal connection may be separable or open so that the two levers can be separated to be cleaned. The pressing member 3 and the sieve member 4 comprise a top or bottom wall 6 or 7 and a side wall 8 or 9, which extends along one side edge of the top or bottom wall 6 or 7. The two side walls 8 and 9 are disposed on opposite sides of the top and bottom walls 6 and 7, which bear on each other when the press is closed. The bottom wall 7 of the sieve member 4 is formed with holes 10 and is adjoined at its end by an end wall 11, which adjoins also the side wall 9. When the side and end walls 8, 9, 11 overlap, they confine a pressing chamber 12, the volume of which decreases continuously as the levers 1, 2, are progressively forced together. The position in which the side and end walls 8, 9, 11 begin to overlap is shown in FIG. 3.

The location of the pivotal connection between the levers 1, 2 is selected so that the levers can perform a pivotal movement of about 180° relative to each other and can move from an open position, which is shown in dotted and dash-dot lines in FIG. 1, into an extended position, which their two longer arms 1', 2' substantially aligned so that the sieve bottom 7 engages the arm 1' on a surface 13, which is adjacent to the pivotal connection 5 and which is provided with pins 14, which may consist of pointed pins or the like and are arranged in the same pattern as the holes 10 so that when the levers 1, 2 are in an extended position the pins 14 penetrate into the holes 10 from the outside and force residual fruit material out of said holes back onto the bottom wall 7. From the latter, the residual fruit material can easily be removed through the open end in the manner described hereinbefore with any cleaning implement.

It will be understood that various modifications in design may be adopted within the scope of the invention. For instance, the pins 14 may be provided on a separate plate 13', which is detachably connected to the lever 1 by means of transversely disposed, opposed slots 15 in the lever as shown in FIG. 4. The pinned plate may alternatively be accommodated in one of the two levers and be removable for use.

What is claimed is:

1. A hand press for a vegetable, herb, spice or fruit, comprising two pivotally connected levers, each of which has two arms of unequal length, the longer arms of the two levers serving as levers which are jointly operable with one hand, the shorter arms of the two levers defining during a movement toward each other a pressing chamber adapted to receive a vegetable, herb, spice or fruit to be squeezed out, the size of which is of the order of magnitude of a clove of garlic, said pressing chamber being defined by at least two side walls, an end wall, which is disposed opposite to the pivotal connection between the two levers, a sieve bottom formed by a sieve member on one of the shorter arms, and a top wall acting as a pressing member on the other of the shorter arms, and a pinned plate on the lever carrying said pressing member, said plate carrying pins that protrude from the plate in the same number and the same pattern as the holes in the sieve bottom and are positioned such that they will enter the sieve openings when the levers are rotated in a direction opposite to the direction of rotation of the pressing operation.

2. A hand press according to claim 1, wherein in that said pressing member and said sieve member are provided each with one of said side walls only on different sides and one of said members which form the sieve bottom and the top wall is provided with said end wall, so that the three side and end walls confine the pressing chamber on the sides and at one end during the pressing operation.

3. A hand press according to claim 1, wherein in that the lever which forms the press member is provided at its longer arm, which constitutes a handle, with the pinned plate adjacent to the pivotal connection between the two levers, and the sieve member of the other lever engages said pinned when the two levers are in an extended position so that the pins then enter the holes.

4. A hand press according to claim 1, wherein in that the pinned plate is detachably connected to one of the two levers.

* * * * *